United States Patent
Mayboroda et al.

(10) Patent No.: US 7,697,717 B2
(45) Date of Patent: *Apr. 13, 2010

(54) METHOD OF EMBEDDING WATERMARK INTO DIGITAL IMAGE

(75) Inventors: Alexander Leonidovich Mayboroda, St. Petersburg (RU); Sergey V. Smolentsev, St. Petersburg (RU); Mikhail A. Sall, St. Petersburg (RU); Viktor V. Redkov, St. Petersburg (RU); Anatoli I. Tikhotsky, St. Petersburg (RU)

(73) Assignee: LG Electronics Inc., Seoul (KR)

( * ) Notice: Subject to any disclaimer, the term of this patent is extended or adjusted under 35 U.S.C. 154(b) by 865 days.

This patent is subject to a terminal disclaimer.

(21) Appl. No.: 11/405,608

(22) Filed: Apr. 18, 2006

(65) Prior Publication Data

US 2006/0188129 A1    Aug. 24, 2006

Related U.S. Application Data

(63) Continuation of application No. 10/106,856, filed on Mar. 27, 2002, now Pat. No. 7,058,201.

(60) Provisional application No. 60/279,124, filed on Mar. 28, 2001.

(51) Int. Cl.
    *G06K 9/00* (2006.01)
(52) U.S. Cl. .................................. 382/100; 382/232
(58) Field of Classification Search .............. 382/100, 382/232–254
See application file for complete search history.

(56) References Cited

U.S. PATENT DOCUMENTS

| | | | | |
|---|---|---|---|---|
| 5,530,751 A | * | 6/1996 | Morris | 380/202 |
| 5,568,570 A | * | 10/1996 | Rabbani | 382/238 |
| 5,659,726 A | * | 8/1997 | Sandford et al. | 707/101 |
| 5,809,139 A | | 9/1998 | Girod et al. | |
| 5,848,155 A | * | 12/1998 | Cox | 382/191 |
| 5,930,369 A | * | 7/1999 | Cox et al. | 380/54 |
| 5,940,507 A | | 8/1999 | Cane et al. | |
| 5,949,055 A | * | 9/1999 | Fleet et al. | 235/469 |
| 5,974,150 A | | 10/1999 | Kaish et al. | |
| 6,005,643 A | * | 12/1999 | Morimoto et al. | 375/240.26 |
| 6,021,196 A | * | 2/2000 | Sandford et al. | 713/176 |
| 6,044,462 A | | 3/2000 | Zubeldia et al. | |
| 6,101,602 A | * | 8/2000 | Fridrich | 713/176 |
| 6,148,342 A | | 11/2000 | Ho | |
| 6,154,571 A | * | 11/2000 | Cox et al. | 382/250 |

(Continued)

OTHER PUBLICATIONS

Hartung et al., Multimedia Watermarking Techniques, Proceedings of the IEEE, vol. 87, No. 7, pps. 1079-1107, Jul. 1999.

(Continued)

*Primary Examiner*—Manav Seth
(74) *Attorney, Agent, or Firm*—Birch, Stewart, Kolasch & Birch, LLP

(57) ABSTRACT

Methods of embedding and detecting a watermark into-from a digital image are disclosed. A method of embedding a watermark in accordance with an embodiment of the present invention into a digital image, the method comprising: generating a difference from an original image; segmenting said difference image into sub-regions; and calculating a watermark block into each sub-region by adding said watermark block with pixel values of each sub-region.

5 Claims, 4 Drawing Sheets

U.S. PATENT DOCUMENTS

| | | | |
|---|---|---|---|
| 6,160,891 | A | 12/2000 | Al-Salqan |
| 6,226,618 | B1 | 5/2001 | Downs et al. |
| 6,229,894 | B1 | 5/2001 | Van Oorschot et al. |
| 6,240,121 | B1* | 5/2001 | Senoh ................. 375/130 |
| 6,246,767 | B1 | 6/2001 | Akins, III et al. |
| 6,256,347 | B1* | 7/2001 | Yu et al. ............. 375/240.13 |
| 6,259,801 | B1* | 7/2001 | Wakasu .................. 382/100 |
| 6,272,253 | B1* | 8/2001 | Bannon et al. .......... 382/236 |
| 6,285,775 | B1* | 9/2001 | Wu et al. ............... 382/100 |
| 6,310,956 | B1 | 10/2001 | Morito et al. |
| 6,358,596 | B1 | 3/2002 | Mehta et al. |
| 6,367,019 | B1 | 4/2002 | Ansell et al. |
| 6,385,596 | B1 | 5/2002 | Wiser et al. |
| 6,389,403 | B1 | 5/2002 | Dorak, Jr. |
| 6,398,245 | B1 | 6/2002 | Gruse et al. |
| 6,404,926 | B1 | 6/2002 | Miyahara et al. |
| 6,418,232 | B1* | 7/2002 | Nakano et al. .......... 382/100 |
| 6,418,421 | B1 | 7/2002 | Hurtado et al. |
| 6,549,626 | B1 | 4/2003 | Al-Salqan |
| 6,550,011 | B1 | 4/2003 | Sims, III |
| 6,577,745 | B1* | 6/2003 | Op De Beeck et al. ... 382/100 |
| 6,584,210 | B1* | 6/2003 | Taguchi et al. ......... 382/100 |
| 6,611,599 | B2 | 8/2003 | Natarajan |
| 6,611,607 | B1 | 8/2003 | Davis et al. |
| 6,633,723 | B1 | 10/2003 | Kuroda et al. |
| 6,643,383 | B1* | 11/2003 | Dugelay ................. 382/100 |
| 6,665,420 | B1* | 12/2003 | Xie et al. .............. 382/100 |
| 6,678,389 | B1 | 1/2004 | Sun et al. |
| 6,678,464 | B1 | 1/2004 | Kawai et al. |
| 6,687,822 | B1 | 2/2004 | Jakobsson |
| 6,707,774 | B1 | 3/2004 | Kuroda et al. |
| 6,711,276 | B1* | 3/2004 | Yoshiura et al. ........ 382/100 |
| 6,741,991 | B2 | 5/2004 | Saito et al. |
| 6,775,382 | B1 | 8/2004 | Al-Salqan |
| 6,802,011 | B1 | 10/2004 | Ogino et al. |
| 6,853,676 | B2 | 2/2005 | Kim et al. |
| 6,891,958 | B2 | 5/2005 | Kirovski et al. |
| 7,000,113 | B1 | 2/2006 | Linnartz et al. |
| 7,002,710 | B1 | 2/2006 | Van Liew et al. |
| 7,047,554 | B1 | 5/2006 | Lortz |
| 7,100,048 | B1 | 8/2006 | Czajkowski et al. |
| 7,203,335 | B2* | 4/2007 | Fielding et al. ......... 382/100 |
| 7,254,838 | B2 | 8/2007 | Kim et al. |
| 2001/0010046 | A1 | 7/2001 | Muyres et al. |
| 2001/0032312 | A1 | 10/2001 | Runje et al. |
| 2001/0053223 | A1 | 12/2001 | Ishibashi et al. |
| 2002/0010861 | A1 | 1/2002 | Matsuyama et al. |
| 2002/0021805 | A1 | 2/2002 | Schumann et al. |
| 2002/0071566 | A1 | 6/2002 | Kurn |
| 2002/0118838 | A1 | 8/2002 | Belenko et al. |
| 2002/0191809 | A1 | 12/2002 | Kirovski et al. |
| 2003/0048922 | A1 | 3/2003 | Rhoads |
| 2004/0034781 | A1 | 2/2004 | Natarajan |
| 2004/0059936 | A1 | 3/2004 | Wakao et al. |
| 2004/0131184 | A1 | 7/2004 | Wu et al. |
| 2005/0018873 | A1 | 1/2005 | Rhoads |
| 2005/0058318 | A1 | 3/2005 | Rhoads |
| 2005/0097333 | A1 | 5/2005 | Kirovski et al. |
| 2005/0097334 | A1 | 5/2005 | Kirovski et al. |
| 2005/0196013 | A1 | 9/2005 | Rhoads |
| 2006/0204032 | A1* | 9/2006 | Nakamura et al. ....... 382/100 |
| 2007/0014354 | A1* | 1/2007 | Murakami et al. ..... 375/240.08 |

OTHER PUBLICATIONS

Wolfgang et al. "Overview of Image Security Techniques With Applications in Multimedia Systems" SPIE vol. 3228, pp. 297-308, 1998.

Bender et al. "Techniques for Data Hiding" IBM Systems Journal, vol. 35, Nos. 3 & 4, pp. 313-336, 1996.

* cited by examiner

The bounding byte block

The information byte block

The control byte block

METHOD OF EMBEDDING WATERMARK INTO DIGITAL IMAGE

CROSS-REFERENCE TO RELATED APPLICATIONS

This application is a Continuation of application Ser. No. 10/106,856, filed on Mar. 27, 2002 now U.S. Pat. No. 7,058, 201, which claims the benefit of U.S. Provisional Application No. 60/279,124, filed on Mar. 28, 2001. The entire contents of each of these applications are hereby incorporated by reference as if fully set forth herein.

BACKGROUND OF THE INVENTION

1. Field of the Invention

The present invention relates to a method of embedding a watermark into a digital image, and more particularly, to a method of embedding a watermark into an image in a manner that the embedded information is robust against any modifications including loss data compression, filtering, channel noise, cropping, geometrical transformations, and etc.

2. Discussion of the Related Art

Digital images are widely distributed on the Internet or with uses of many types of storage such as CD-ROM, hard and floppy disks, and etc. Therefore, the copyright protection of such digital images has become a very significant issue in the current digital media industry. One of ways of preserving the intellectual property rights of the digital images is digital watermarking.

One of typical digital watermarking methods is a statistical approach, which will be referred to as Patchwork hereinafter. Patchwork is based on a pseudo random and statistical process. It invisibly embeds a set of specific statistical information that has a Gaussian distribution into a host image. Some of main features of this approach are an extremely low rate of the embedded data and difficulties of decoding a watermark in the presence of severe affine transformation.

Another digital watermarking method is a spread spectrum technique, which proposes to embed watermark information in a log-2-spatio domain by using a spread spectrum technique. In the log-2-spatio domain, the variance of the information is significantly reduced. This improves the efficiency and robustness of spread spectrum technique. Low intensity and midband regions are selected to embed the information in order to guarantee the invisibility of the watermark as well as the robustness to JPEG compression.

Also, an effect that a channel coding process produces on the performance of the watermarking detection is analyzed. However, the mentioned methods or techniques do not achieve the main demands for watermarking, which are invisibility of watermarks and robustness to attacks including loose compression, filtering, geometric attacks such as re-sampling and rotations, and so on.

SUMMARY OF THE INVENTION

Accordingly, the present invention is directed to a method of watermarking a digital image that substantially obviates one or more problems due to limitations and disadvantages of the related art.

An object of the present invention is to provide a method of watermarking a digital image that is robust to any prevailing attacks Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of embedding a watermark into a digital image includes the steps of generating a predicted image of an original image by using a linear predictor; generating a difference image by subtracting the predicted image from the original image or vice versa; and segmenting the difference image into sub-regions.

In another aspect of the present invention, a method of detecting a watermark from a digital image includes generating a predicted image from an original image by using a linear predictor, wherein an original watermark sequence is embedded into the original image; generating a difference image by subtracting the predicted image from the original image or vice versa; and segmenting the difference image into sub-regions.

According to another aspect, the present invention provides a method of embedding a watermark into a digital image, the method comprising: generating a difference from an original image; segmenting said difference image into sub-regions; and calculating a watermark block into each sub-region by adding said watermark block with pixel values of each sub-region.

According to another aspect, the present invention provides a method of detecting a watermark of a digital image, the method comprising: generating a difference image from an original image, wherein a watermark sequence is embedded into said original image; segmenting said difference image into sub-regions; calculating a convolution set of a pseudo random sequence and at least one pixel of each sub-region; and estimating a watermark data bit corresponding to each sub-region by using said convolution set.

It is to be understood that both the foregoing general description and the following detailed description of the present invention are exemplary and explanatory and are intended provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
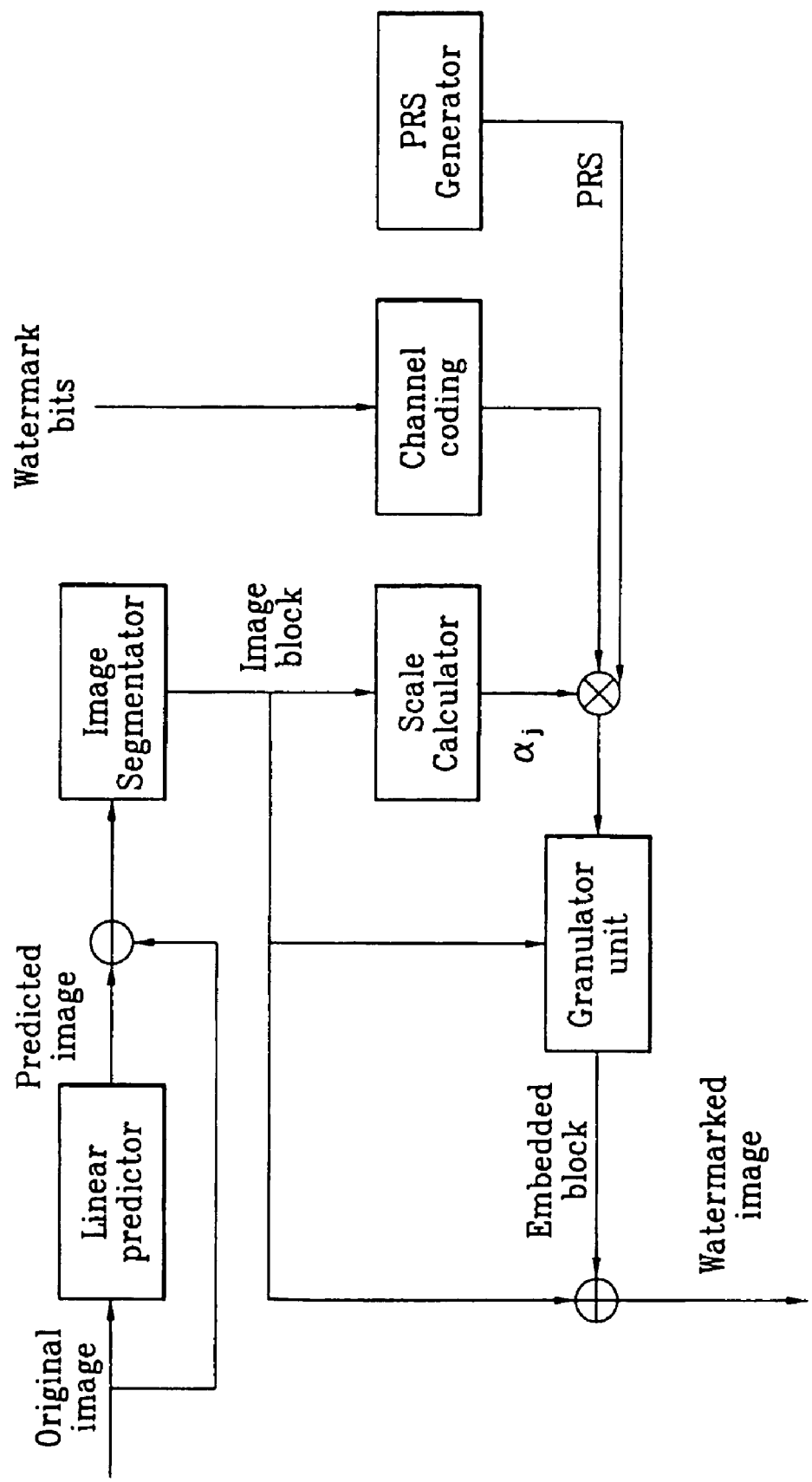
FIG. 1 illustrates a watermark embedding process according to the present invention.

FIG. 1 shows a preferred embodiment of a watermark encoder embedding a watermark in accordance with the present invention. For embedding a watermark, an original image is divided into non-overlapped regions $\Omega=\{\Omega_0, \ldots, \Omega_{M-1}\}$, each of which corresponds to a bit of the watermark, by an image segmetator. A given sequence of bytes is used as an embedded information set (4-5 bytes are written K times into an image). The main feature of the proposed algorithm is that a difference image D is used for embedding/detecting a watermark. In order to form the difference image, a linear prediction image is generated by a linear predictor.

A pseudo random sequence (PRS) generator generates a PRS for watermark embedding. Initial parameters and period characterize this sequence. The algorithm of the watermark embedding and detecting processes using a PRS is given by $$Y_i = X_t + \beta_j \cdot \varepsilon_i, \beta_j = \begin{cases} 1, w_j = 1 \\ -1, w_j = 0 \end{cases}$$

$$P = \{p_0, \ldots, p_{N-1}\}, p_t \in \{-1, 1\}$$

$$W = \{w_0, \ldots, w_{M-1}\}, w_j \in \{0, 1\}$$

$$\varepsilon_i = \alpha_j \cdot p_i \alpha_j = f(\Omega_j),$$

where $X_i$ represents the pixel values of an original image region $\Omega_j$;
P represents a pseudo random sequence (PRS);
W represents a watermark bit sequence; and
$\epsilon_i$ represents an embedded sequence ($\alpha_j=1$ for a simplest case).

Figure 2:
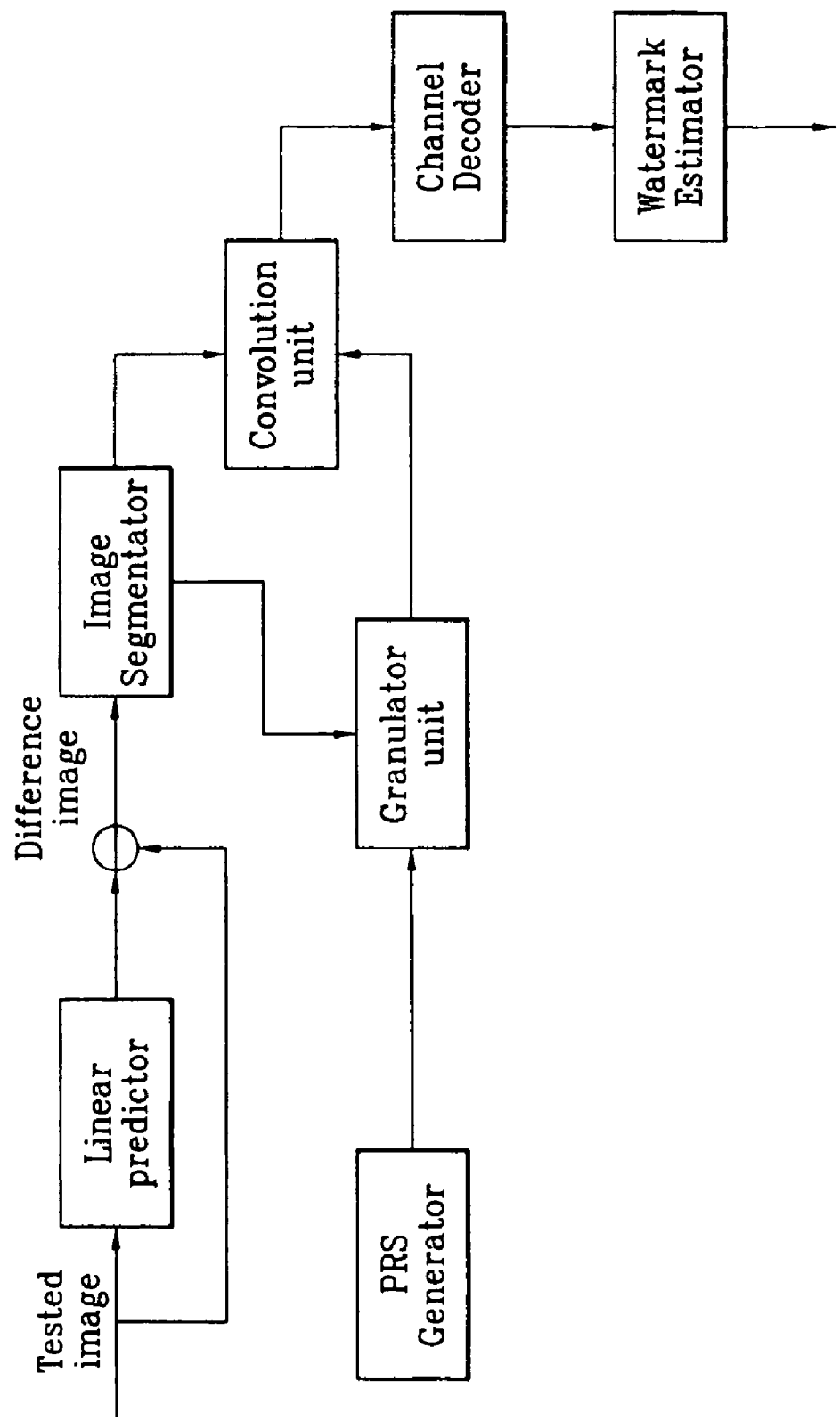
FIG. 2 illustrates a watermark detecting process according to the present invention.

FIG. 2 illustrates a preferred embodiment of a watermark decoder detecting a watermark in accordance with the present invention. A jth bit of a watermark is decoded by using a convolution set of PRS with the pixel of a region $\Omega_j$ (convolution unit):

$$S_j \sum_{\Omega_j} D_i \cdot p_i \text{ and}$$

$$\hat{w}_j = \text{sign}(S_j),$$

where $D_i$ represents a component of a difference image; and
$\hat{w}_j$ represents an estimation of the jth watermark bit.

A watermark of six-bytes sequence XABCDE is used, where X represents the constant byte for inner purposes of the algorithm, and other bytes contain the copyright information of an image. The watermark is recorded into the image K times depending on the block size and the image size. During the decoding process, the values of bits for all blocks are estimated. Further, the beginning of the watermark is searched by using the X value and the obtained bit sequences are written into an array $$\begin{matrix} w_0^0 & w_1^0 & \ldots & w_L^0 \\ w_0^j & w_1^j & \ldots & w_L^j \\ \ldots & \ldots & \ldots & \ldots \\ w_0^K & w_1^K & \ldots & w_L^K \end{matrix}$$

where $w_i^j$ is an estimation of the bit number i of the copy number j of the watermark.

The estimation of the watermark can be obtained for every bit by $$\hat{w}_j = \begin{cases} 1 \text{ if } s \geq 0.5 \\ 0 \text{ if } s < 0.5 \end{cases} \text{ where } s = \frac{\sum_{j=0\ldots K} w_i^j}{K+1}$$

The perceptibility of a watermark depends on the amplitude of an embedded sequence, which is determined by a scale coefficient $\alpha^j$. This coefficient controls the compromise of the perceptibility versus the possibility of detection. The scale calculator calculates the amplitude of the watermark for every block by one of the following ways:

(1) Block Scale mode:

$$\alpha^j = 1 + \frac{\sum_{\Omega_j} |D_i|}{\text{Scale} \cdot N \cdot g^2} \text{ and } \alpha_i = \alpha^j$$

(2) Pixel Scale mode:

$$\alpha^j(l) = 1 + \frac{|D_i|}{\text{Scale}},$$

where $D_i$ represents a component of a difference image. In Block Scale mode, $\alpha^j$ corresponds to a whole region $\Omega_j$. On the other hand, $\alpha^j(l)$ in Pixel Scale mode corresponds to each pixel of the region $\Omega_j$. The parameter Scale shown in both equations is in the range of 2 to 10.

In addition to the modes mentioned above, an adaptive scale mode can be implemented. The adaptive scale mode chooses the best value of the Scale parameter by iterations. The adaptive scaling process of choosing the best value depends on the original image. A larger Scale value leads to better watermark detection, but it deteriorates the quality of the image. The use of a smaller Scale value decreases the quality of the watermark detection. The adaptive calculation is performed with a feedback. At first, the block is encoded with Scale=10. Then the decoding is fulfilled. If decoding is successful, then the encoding of the next block is executed. Otherwise, the value of Scale is decreased (Scale=Scale/2), and the encoding is executed. The minimal value of Scale is set to Scale=2. So it is possible to select the optimal value of Scale. In the case where it is impossible to decode the watermark, this fact is known at the encoding stage.

The granulator is used to resist the low pass filtering and embeds the element PRS not in a pixel but in a square (g×g) of pixels. The increase of the parameter g leads to decrease the frequency of the embedded signal. But it increases the watermark perceptibility. The acceptable values of the parameter g are 2 and 3. The usage of the granular mode increases the block size for writing the watermark. It leads to decrease the number of watermarks written into the image.

The randomization is used for decreasing the watermark perceptibility in the granular mode. In this mode, a random sequence $\tilde{\epsilon}_{ik}=\epsilon_i+w_k$ is embedded in square instead of the constant signal $\epsilon_i$, where $w_k$ is uniformly distributed in the range $[-\epsilon_i, \epsilon_i]$. Under decoding, the estimation of the obtained signal is performed by $$X_i = \frac{\sum_{r \in g \times g} X_r}{g^2}.$$

Figure 3:
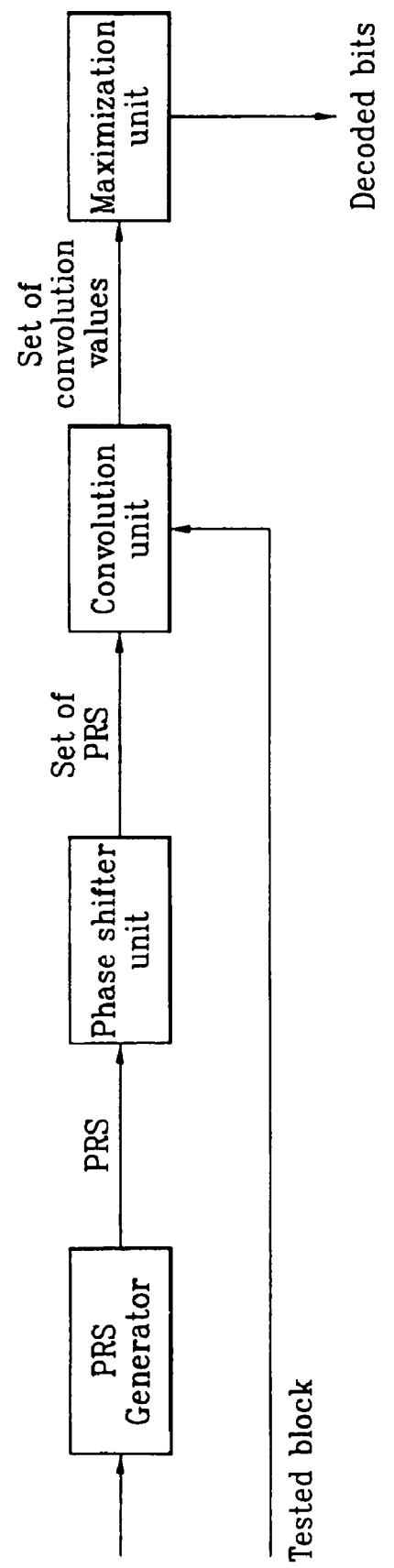
FIG. 3 illustrates a high-density watermark embedding process according to the present invention.
Figure 4:
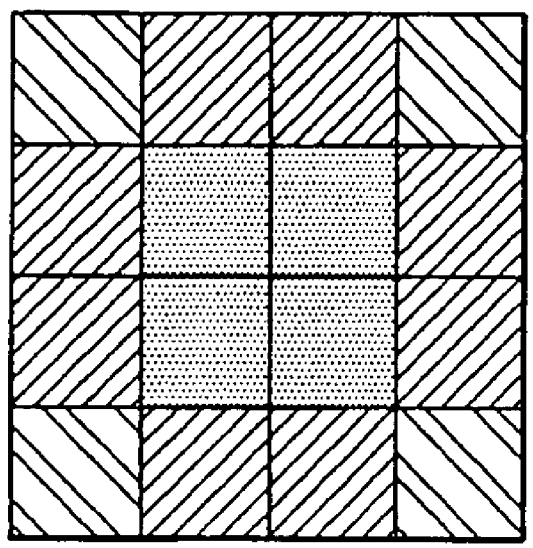
FIG. 4 illustrates the structure of a block watermark in accordance with the present invention.
Figure 4:
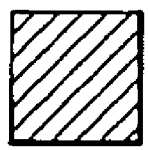
Figure 4:
Figure 4:
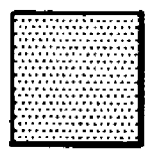

The usage of the channel coding unit and the granulator unit decreases the number of bits, which can be written into an image. Therefore, the preferred embodiment of the present invention includes a way of writing additional bits into a block, and this is called a high-density mode. The block scheme of a method of detecting a high-density watermark is shown in FIG. 3. The main distinction of the proposed way of embedding is that a set of shifted PRSs, which are generated by the Phase Shifter, is used for the watermark embedding/detecting processes.

Another distinctive feature is to order an image block for increasing the number of states coded. Then the convolution unit calculates a set of convolution values for the shifted PRSs and orders an image block in different ways. The maximization unit compares the obtained convolution values and selects the convolution value corresponding to the maximum absolute value. The index of found convolution values conforms to the decoded bit set. The preferred embodiment of the algorithm writes 8 bits into a block. It uses 16 shifted PRSs and 8 types of ordering for transmitting 256 states.

The base-coding mode presumes to write a watermark in a sequential order (row-by-row). This means that the watermark does not go into the block row. In a case where the size of an image is slightly changed, all watermarks included in the image will be destroyed. Another problem is that if the blocks containing the watermark flag are not decoded, the whole watermark will be skipped until the next watermark flag. The block mode presumes to write the watermark into compact regions, for example, a square region (4×4) of the block size. Under this mode, the high-density mode is used automatically. In as much as the watermark is written into 16 blocks, four blocks are used as flags bounding the watermark region. Another 12 blocks are used for writing the watermark information (4 information bytes and 8 control bytes providing the correction of 4 bytes). The bounding bytes contain different values so it is possible to determine the type of the corner. Therefore, in case of decoding errors, it is sufficient to decode two bytes to determine the correct position of the watermark. The number of watermarks embedded into the image is less, but the reliability is apparently higher.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of embedding a watermark into a digital image, the method comprising:
    generating a predicted image of an original image by using a linear predictor;
    generating a difference image by subtracting the predicted image from an original image or vice versa;
    segmenting the difference image into sub-regions;
    calculating a watermark block for each of the sub-regions; and
    embedding the watermark block into each of the sub-regions by adding the watermark block with pixel values of each of the sub-regions.

2. The method of claim 1, wherein the calculating a watermark block, comprises:
    calculating a watermark amplitude for each of the sub-regions or each pixel of each of the sub-regions;
    performing a channel coding process on a set of watermark data bits; and
    generating a pseudo random sequence (PRS) for embedding the watermark.

3. The method of claim 2, wherein the watermark amplitude is calculated by using any one of a block scale mode, a pixel scale mode and an adaptive scale mode.

4. The method of claim 3, wherein a best value of the scale parameter by iterations is chosen of the adaptive scale mode is used.

5. The method of claim 2, wherein the performing of the channel coding process and the generating of the pseudo random sequence are used for decreasing a number of bits, which can be written into an image.

* * * * *